(12) United States Patent
Araujo (10) Patent No.: US 7,275,113 B1
(45) Date of Patent: Sep. 25, 2007

(54) DYNAMIC NETWORK ADDRESS CONFIGURATION SYSTEM AND METHOD

(75) Inventor: Kenneth Araujo, Sunnyvale, CA (US)

(73) Assignee: 3 Com Corporation, Marlborough, MA (US)

( * ) Notice: Subject to any disclaimer, the term of this patent is extended or adjusted under 35 U.S.C. 154(b) by 0 days.

(21) Appl. No.: 09/322,114

(22) Filed: May 27, 1999

(51) Int. Cl.
*G06F 15/16* (2006.01)

(52) U.S. Cl. .................. 709/245; 709/203; 370/389; 370/352

(58) Field of Classification Search ............... 709/245, 709/219, 244, 224, 238, 227, 222, 250, 223, 709/225, 226, 200, 217, 203, 221, 218; 707/10, 707/102; 370/402, 238, 219; 455/430; 714/4
See application file for complete search history.

(56) References Cited

U.S. PATENT DOCUMENTS

| | | | | |
|---|---|---|---|---|
| 5,095,480 A | * | 3/1992 | Fenner | 370/238 |
| 5,473,599 A | * | 12/1995 | Li et al. | 370/219 |
| 5,677,910 A | * | 10/1997 | Delaney | 370/402 |
| 5,796,944 A | * | 8/1998 | Hill et al. | |
| 5,915,097 A | * | 6/1999 | Chao | 709/238 |
| 5,920,699 A | * | 7/1999 | Bare | 709/225 |
| 5,983,350 A | * | 11/1999 | Minear et al. | 726/11 |
| 6,009,469 A | * | 12/1999 | Mattaway et al. | 709/227 |
| 6,012,088 A | * | 1/2000 | Li et al. | 709/219 |
| 6,023,724 A | * | 2/2000 | Bhatia et al. | 709/218 |
| 6,085,238 A | * | 7/2000 | Yuasa et al. | 709/223 |
| 6,112,232 A | * | 8/2000 | Shahar et al. | 709/217 |
| 6,151,497 A | * | 11/2000 | Yee et al. | 455/430 |
| 6,195,691 B1 | * | 2/2001 | Brown | 709/219 |
| 6,195,705 B1 | * | 2/2001 | Leung | 709/245 |
| 6,256,635 B1 | * | 7/2001 | Arrouye et al. | 707/102 |
| 6,430,595 B1 | * | 8/2002 | Ferguson et al. | 709/200 |
| 6,430,698 B1 | * | 8/2002 | Khalil et al. | 714/4 |
| 6,502,131 B1 | * | 12/2002 | Vaid et al. | 709/224 |
| 6,571,282 B1 | * | 5/2003 | Bowman-Amuah | 709/219 |
| 6,684,336 B1 | * | 1/2004 | Banks et al. | 709/227 |
| 6,816,903 B1 | * | 11/2004 | Rakoshitz et al. | 709/226 |
| 2001/0006519 A1 | * | 7/2001 | Voit | 370/352 |

(Continued)

OTHER PUBLICATIONS

Terao et al, A Shared Secured Server for Multiple Closed Networks, IEEE Feb. 1999.*

(Continued)

*Primary Examiner*—Thong Vu (57) ABSTRACT

A dynamic network address registration system and method. In one embodiment, the present invention is comprised of a first device which is adapted to communicate over a communications network. The present invention is a also comprised of a second device which is adapted to communicate via a communications network, and, more specifically, is adapted to communicate with the first device via the communications network. The present invention is further comprised of a controller which is adapted to be coupled to the communications network. The controller of the present invention is adapted to store address information for the first device, and to store address information for the second device therein. The controller is further adapted to provide the address information of the second device to the first device such that a communication path can be efficiently established between the first device and the second device via the communications network. In so doing, the present embodiment provides for the efficient establishment of a communications path between the first device and the second device via the communications network without requiring that the first device and the second device have a static address.

17 Claims, 6 Drawing Sheets

U.S. PATENT DOCUMENTS

2002/0035594 A1* 3/2002 Dreke et al. ................ 709/203
2003/0097430 A1* 5/2003 Matsukura ................ 709/221

OTHER PUBLICATIONS

RAT: A Quick (And Dirty?) Push for Mobility Suppport—Singh, Tay, Teo, Yeow (1999) www.research.att.com/conf/wmcsa99/papers/singh.ps.gz.*

VIP: A Protocol Providing Host Mobility—Teraoka, Uehara, Sunahara, Murai (1994) www.cosc.canterbury.ac.nz/~hpark/academic/research/papers/VIP/teraoka94.ps.*

ATM on Linux—The 3rd year—Werner Almesberger Werner (1997) ast21.csis.hku.hk/download/atm/atm_3rd.ps.gz.*

* cited by examiner

| NAME OF A PARTICULAR DEVICE | DYNAMIC NETWORK ADDRESS CURRENTLY ASSIGNED TO DEVICE |
|---|---|
| PC 211 | 192.1.370 |
| SEVER 292 | 192.1.380 |
| | |
| | |
| | |

DYNAMIC NETWORK ADDRESS CONFIGURATION SYSTEM AND METHOD

FIELD OF THE INVENTION

The present invention relates to the field of network communications. More particularly, the present invention relates to a system and method for establishing a communication path within a communications network.

BACKGROUND OF THE INVENTION

Reliable communication of information is critical to the advancement of a modern society. In particular, electronic technologies that rely on data communications are utilized in a number of applications to achieve advantageous results, such as increased productivity and reduced costs in analyzing and communicating data, ideas and trends in most areas of business, science, education and entertainment. Often these advantageous results are realized and maximized through the use of distributed resources situated in remote locations from one another. Computer systems are one example of an electronic technology that often rely on distributed resources to run complicated applications. Usually computer systems combine processing and data storage capabilities of multiple computing units through networking. The advantages of networking resources has resulted in a significant expansion in the number of devices coupled to networks and this growth has resulted in a tremendous need for connectivity between numerous devices and networks. However, long distance communications between computers located in different sites is usually expensive.

Networks can be arranged in numerous configurations comprising a variety of network types. Some of the most popular types of networks comprise Ethernet (coaxial cable or twisted-pair cable), token ring, Fiber Distributed Data Interface (FDDI), Frame Relay, Integrated Services Digital Network (ISDN), X.25, and Synchronous Data Link Control (SDLC). Typically these networks are arranged in local area networks (LANs) and wide area networks (WANs). Some users utilize public WANs as virtual private networks (VPNs). Commonly, connections over such WANs are typically accomplished using, for example, circuit switched networks. Due to the prolonged duration of typical connections utilized in conventional networking environments, and due to the high cost required to use circuit switched networks, communication paths established over such circuit switched network are extremely expensive. As a result, establishing a communication path between a first device and a second device over circuit switched network has severe cost-based disadvantages associated therewith.

In one prior art attempt to provide a communication path between a first device and a second device, static addresses are employed in, for example, and internet environment. In the prior art, in order for a first device to establish a communication link over a communications network (e.g. the internet), the first device must know the address of the second device. However, in some communications networks (e.g. the internet) such device addresses are dynamic. That is, each device may be assigned a new address each time the device connects to the communications network. Thus, the first device (e.g. a computer at a first site of a business) may not know the proper internet protocol (IP) address of the second device (e.g. another computer at a second site of the business). In an attempt to resolve this issue users of the first and second devices may purchase static (i.e. unchanging) IP addresses for their respective devices. As a result, the users can inform desired parties of the device's static IP address. Hence, the first device will then know the address of the second device. Unfortunately, such static address are limited in supply and are extremely expensive. In fact, such static addresses are often too expensive for the average network user.

Thus, a need exists for a method and system for efficiently establishing a communication path between a first device and a second device via a communications network. A further need exists for a method and system for efficiently establishing a communication path between a first device and a second device wherein the system and method meets the above need and does not require communication paths to be established using circuit switched networks for prolonged periods of time. Still another need exists for a system and method for efficiently establishing a communication path between a first device and a second device wherein the system and method meets the above-listed needs and does not require the use of static addresses.

SUMMARY OF THE INVENTION

The present invention provides a method and system for efficiently establishing a communication path between a first device and a second device via a communications network. The present invention further provides a method and system for efficiently establishing a communication path between a first device and a second device wherein the system and method accomplishes the above-listed achievement and does not require communication paths to be established using circuit switched networks for prolonged periods of time. The present invention also provides a method and system for efficiently establishing a communication path between a first device and a second device wherein the system and method accomplishes the above-listed achievements and does not require the use of static addresses.

In one embodiment, the present invention is comprised of a first device which is adapted to communicate over a communications network. The present invention is a also comprised of a second device which is adapted to communicate via a communications network, and, more specifically, is adapted to communicate with the first device via the communications network. The present invention is further comprised of a controller which is adapted to be coupled to the communications network. The controller of the present invention is adapted to store address information for the first device, and to store address information for the second device therein. The controller is further adapted to provide the address information of the second device to the first device such that a communication path can be efficiently established between the first device and the second device via the communications network. In so doing, the present embodiment provides for the efficient establishment of a communications path between the first device and the second device via the communications network without requiring that the first device and the second device have a static address. Additionally, the present embodiment does not require communication paths to be established using circuit switched networks for prolonged periods of time.

These and other benefits and advantages of the present invention will no doubt become obvious to those of ordinary skill in the art after having read the following detailed description of the preferred embodiments which are illustrated in the various drawing figures.

DESCRIPTION OF THE DRAWINGS

The accompanying drawings which are incorporated in and form a part of this specification, illustrate embodiments of the invention and together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, a dynamic network address configuration system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The system and method of the present invention provides information regarding a dynamic IP network address associated with a first device (e.g., a server, PC, NAT, etc.) to a second device (e.g., a router or NAT) with minimal or no manual configuration of the second device. In one embodiment of the present invention, a first network device establishes its own dynamic IP network address via a secondary circuit or channel (e.g. a circuit switched network) and utilizes a primary circuit or channel (e.g. the internet) to register its dynamic IP network address with a dynamic address network configuration system (controller) and to participate in principal network communications. For example, a first network device such as a PC establishes its own dynamic IP network address by communicating with an ISP over a D-channel of an ISDN connection and then communicates with a dynamic address network configuration system or other devices via circuit switched calls on a B-channel. A dynamic address network configuration system of the present invention tracks dynamic network addresses assigned to devices participating in a network and provides assigned dynamic network address information to devices that request it.

Figure 1A:
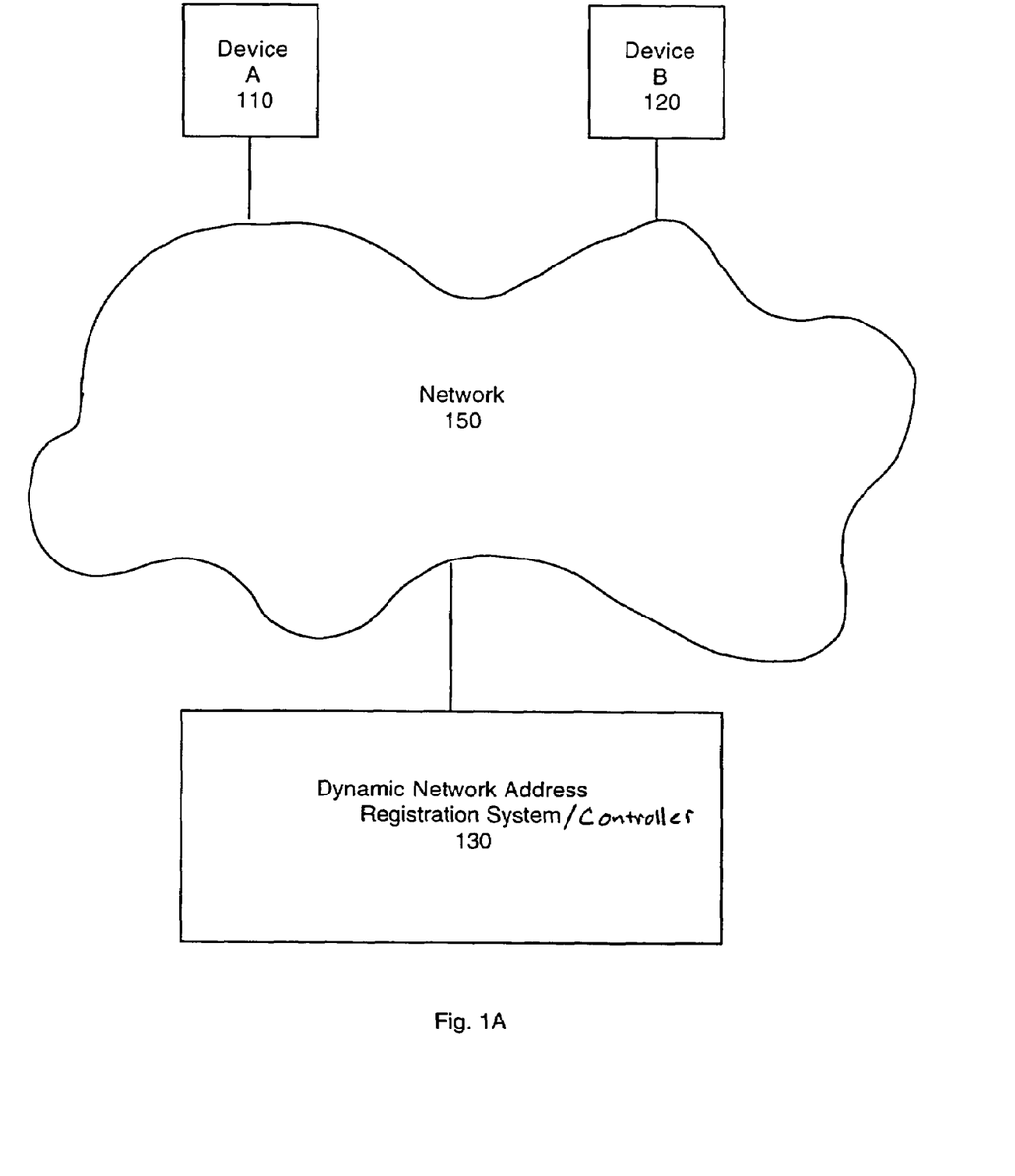
FIG. 1A is block diagram illustrating one embodiment of a dynamic network address minimal configuration system of the present invention.

FIG. 1A is block diagram illustrating dynamic network address minimal configuration system 100. Dynamic network address minimal configuration system 100 comprises a first device, device A 110, a second device, device B 120, a controller hereinafter referred to as a dynamic network address registration system/controller 130 and communication network 150 (also referred to as network 150). Network 150 is coupled to first device A 110, second device B 120 and dynamic network address registration system/controller 130. Device A 110 and Device B 120 are devices used to facilitate interaction and communications via network 150 (e.g., a personal computer, NAT, router, etc.). For purposes of the present discussion, network 150 includes primary and secondary communication circuits or channels (e.g. a circuit switched network and also e.g. the internet) and allows communication paths between devices coupled to network 150 to be established thereon. Dynamic network address registration system/controller 130 stores information regarding the assignment of dynamic network addresses to devices.

Dynamic network address minimal configuration system 100 provides information regarding the assignment of a dynamic network address to devices coupled to dynamic network address minimal configuration system 100 and facilitates the automatic configuration of network components with minimal manual intervention. For example, device A 110 utilizes a secondary communications circuit or channel to access network 150 and obtains a dynamic network address. Device A 110 utilizes a primary communication circuit or channel to establish communications with dynamic network address registration system/controller 130 and forwards information regarding the dynamic network address assigned to device A 110. Dynamic network address registration system/controller 130 stores information regarding the association of device A 110 and the dynamic network address assigned to device A 110. Dynamic network address registration system/controller 130 also transmits to device A 110 a network address associated with dynamic network address registration system/controller 130. Device B 120 also utilizes a secondary circuit or channel to establish a dynamic network address and uses a primary circuit or channel to transmit to dynamic network address registration system/controller 130 information regarding the association between device B 120 and its dynamic network address. Then device A 110 and device B 120 utilize dynamic network address registration system/controller 130 to facilitate automatic downloading of information regarding each other's assigned dynamic network address and automatic configuration of network components.

Figure 1B:
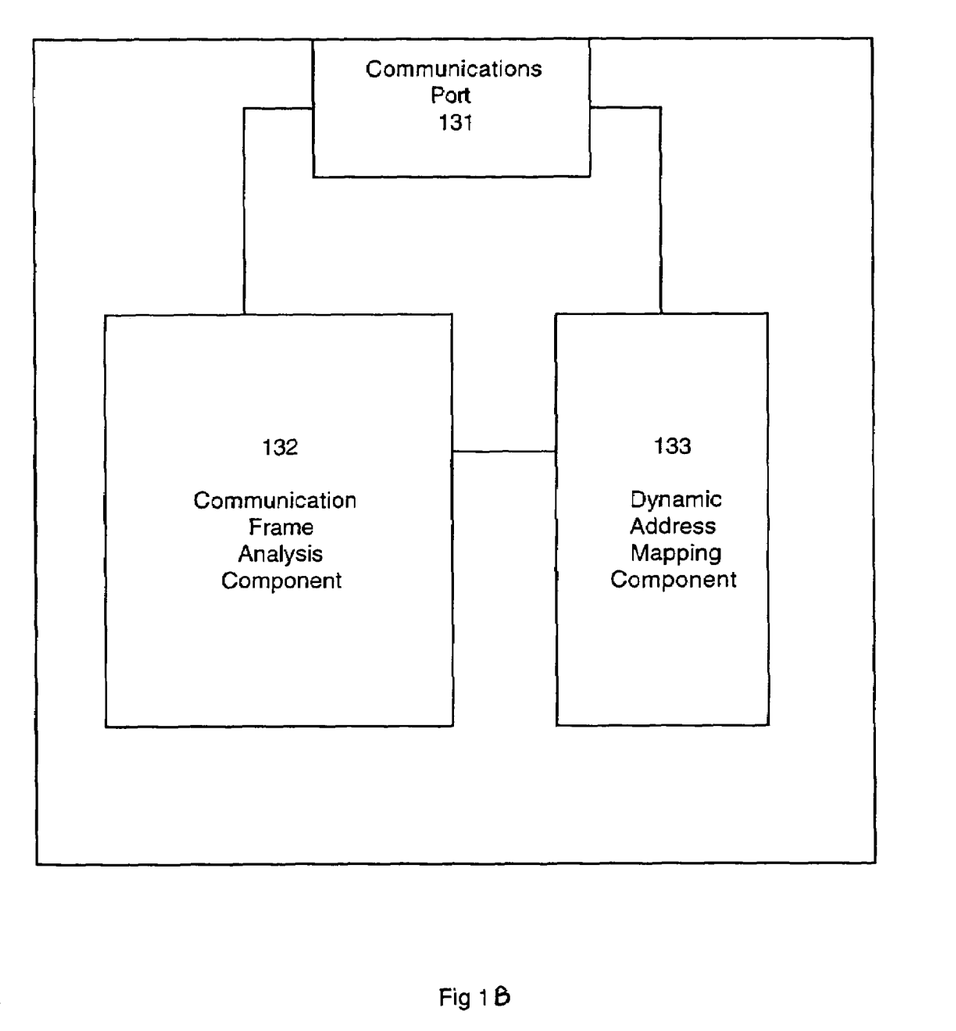
FIG. 1B is a block diagram illustrating one embodiment of a dynamic network address registration system of the present invention.

FIG. 1B is a block diagram illustrating one embodiment of dynamic network address registration system/controller 130. In one embodiment, dynamic network address registration system/controller 130 is included in an intermediate device coupled to a network. Dynamic network address registration system/controller 130 comprises means for coupling to a communications network, for example, communications port 131; means for storing address information of a first device therein and means for storing address information of a second device therein, for example, communication frame analysis component 132; and means for providing the address information of the second device to the first device such that a communication path can be efficiently established between the first device and the second device via the communications network, for example, dynamic address mapping component 133. Communications port 131 is coupled to communication frame analysis component 132 and dynamic address mapping component 133. Communication frame analysis component 132 is coupled to dynamic address mapping component 133. The components of dynamic network address registration system/controller 130 interact with one another to facilitate communications with devices having dynamic addresses.

Communications port 131 transmits and receives communication frames to and from devices coupled to dynamic network address registration system/controller 130. In one embodiment of dynamic network address registration system/controller 130, communications port 131 transmits and receives communication frames via multiple communication circuits or channels including a primary and a secondary communications circuit or channel. For example communications port 131 transmits communication frames via different networks including the Internet or a direct modem switched circuit communication link that are used for primary communication circuits or secondary communication circuits.

Communication frame analysis component 132 is adapted to analyze information included in a communication frame. Communication frame analysis component 132 examines the information included in a communication frame and ascertains the name of a principal destination device. The principal destination device is the desired device that a user ultimately wants to communicate with and has been assigned a dynamic network address. Communication frame analysis component 132 determines if the communication frame is requesting information regarding an assigned dynamic network address or forwarding a dynamic network address for registration in dynamic network address registration system/controller 130. If the communication frame is requesting information regarding an assigned dynamic network address, dynamic network address registration system/controller 130 provides the information to the requesting device. If the communication frame is forwarding a dynamic network address for registration in dynamic network address registration system/controller 130, communication frame analysis component 132 issues an instruction to dynamic address mapping component 140 to map a dynamic address to the name of a particular principal destination device if a communication frame.

Dynamic address mapping component 133 is adapted to map a dynamic network address to a device name. Communication frames forwarding a dynamic network address for inclusion in dynamic address mapping component 140 also include information regarding the name of a destination device that has been assigned the dynamic network address. Dynamic address mapping component 140 retains a record of the association between the named device and dynamic IP network address. In one embodiment of the present invention dynamic address mapping component 140 disregards a prior association if the prior dynamic IP network address or device name is presented to dynamic address mapping component 140 in association with a new device or new dynamic IP network address. In one embodiment the dynamic address mapping component 140 includes a directory name service (DNS) that provides a mapping of designated names in a uniform resource locating (URL) protocol to dynamic IP network addresses.

Although dynamic network address minimal configuration system 100 is described in terms of one embodiment of the present invention, it should be appreciated the present invention is also well suited for use in other configuration. For example, in some situations dynamic network address minimal configuration system 100 is implemented in networks comprising a LAN and a WAN. In one embodiment, dynamic network address minimal configuration system 100 is utilized to establish a virtual private network (VPN) via the Internet. In some embodiments tracking dynamic addresses by dynamic network address minimal configuration system 100 is controlled by software. In yet other embodiments the present invention is implemented in combinations of software, hardware and firmware which automatically track dynamic address assignments and forwards the relevant dynamic address information to and from devices coupled to dynamic network address minimal configuration system 100.

Figure 2:
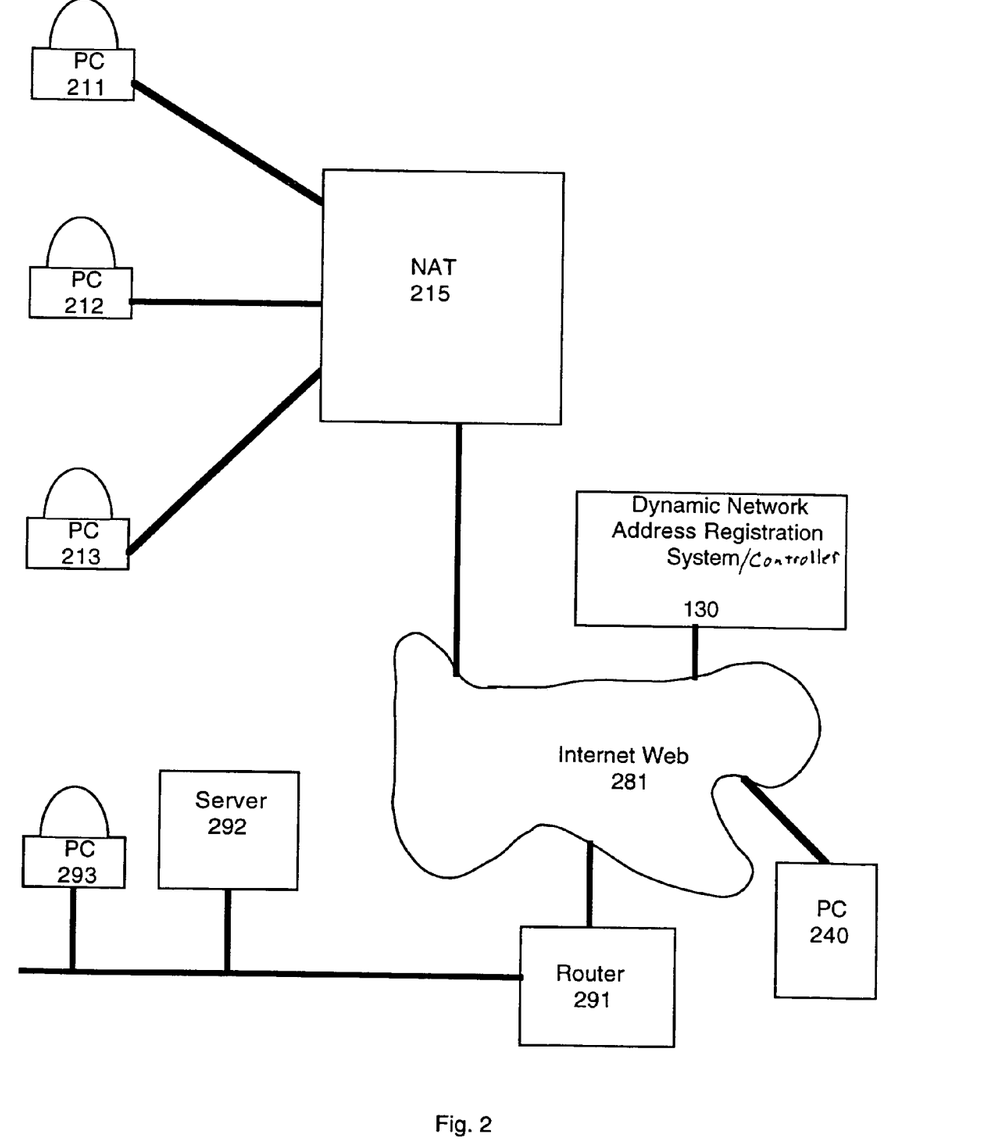
FIG. 2 is a block diagram showing one embodiment of a dynamic network address minimal configuration system of the present invention.

FIG. 2 is a block diagram illustrating dynamic network address minimal configuration system 200, one embodiment of the present invention. Network address minimal configuration system 200 comprises NAT 215, router 291, PC 211, PC 212, PC 213, PC 240, PC 293, server 292, dynamic network address registration system/controller 130 and network 281. NAT 215 is coupled to PC 211, PC 212, and PC 213 in a configuration that comprises a first LAN in a home. Router 291 is coupled to PC 291 and Server 292 in an arrangement that comprises a second LAN at a business. Internet web 281 is coupled to NAT 215, router 291, PC 240 and dynamic network address registration system/controller 130 in a configuration that comprises a WAN. Each device coupled to the WAN has access at its location to at least one ISDN basic rate interface (BRI) for connectivity to the wide area network Internet Web 281 and an always on dynamic ISDN (AODI) feature is supported for each of these BRIs. AODI is a feature of ISDN that uses an ISDN signaling channel (e.g., D-channel) to have a low speed connection that is active (e.g., to an ISP).

Devices coupled to network address minimal configuration system 200 utilize communication paths of network address minimal configuration system 200 and the present invention to establish communications to devices that are assigned dynamic IP network addresses. Dynamic network address registration system/controller 130 tracks the assignment of dynamic IP network addresses to devices included in network address minimal configuration system 200. PC 211, PC 212, PC 213, PC 240, and PC 291 permit users to interact with devices coupled to network address minimal configuration system 200. Server 292 is a system that provides services including database access, network management, and centralized file storage. Router 291 router provides traffic control and filtering functions between communication points on both sides of router 291. NAT 215 is associated with a primary LAN including PC 211, 212 and 213 and facilitates the transmission of communications from the primary LAN to internet web 281 by translating between a primary LAN IP network address for a device and an internet web 281 network address. Internet Web 281 facilitates communications between devices coupled to it.

Router 291 and NAT 215 also maintain a list of the directory numbers corresponding to other devices coupled to network address minimal configuration system 200, such as dynamic network address registration system/controller 130. Maintaining directory numbers in router 291 and NAT 215 enables circuit switched calls to be placed to other devices included in network address minimal configuration system 200. In one embodiment of router 291 and NAT 215, numbers corresponding to other devices coupled to network address minimal configuration system 200 are entered individually via a management interface and in another embodiment they are downloaded from a central management station (not shown).

Utilizing the connections of network address minimal configuration system 200 and facilitated by the present invention, multisite communications associated with VPNs are established via dynamic IP network addresses with minimal manual configuration. Router 291 and NAT 215 make an AODI connection to their respective local ISP over a D channel when they initially come on line and obtain assignment of a dynamic network address. In one embodiment, local D-channel connections of network address minimal configuration system 200 are relatively low cost connections. Router 291 and NAT 215 then call up the dynamic network address registration system/controller 130 via circuit switched calls (e.g., over a ISDN B-channel). Utilizing switched circuit calls, router 291 and NAT 215 register their dynamic IP network address (corresponding to its AODI connection) with dynamic network address registration system/controller 130. It also obtains the IP network address assigned to the dynamic network address registration system/controller 130. In one embodiment of the present invention, the IP network address of dynamic network address registration system/controller 130 is actually assigned via an AODI link to a router that processes communications to and from a site at which dynamic network address registration system/controller 130 is located. After obtaining the appropriate dynamic IP network address information router 291 and NAT 215 tear down the circuit switched calls with dynamic network address registration system/controller 130.

Once router 291 and NAT 215 tear down the circuit switched calls with dynamic network address registration system/controller 130, they establish VPN connections with dynamic network address registration system/controller 130 via respective local ISPs for router 291 and NAT 215. By establishing a VPN via their respective local ISP providers, router 291 and NAT 215 are able to avoid long distance toll charges for communications with dynamic network address registration system/controller 130. Router 291 and NAT 215 use the VPN across the Internet to communicate with the dynamic network address registration system/controller 130's server or router and obtain a list of other devices (e.g., routers or NATs) that have registered with the dynamic network address registration system/controller 130, as well as dynamic IP network addresses associated with such devices. In one embodiment, router 291 and NAT 215 periodically poll the dynamic network address registration system/controller 130 via their VPN connection to dynamic IP network address information and find out if any new devices have registered. Using these dynamic IP network addresses, devices (e.g., a router or NAT) at each site in network address minimal configuration system 200 is able to establish VPN connections with other devices to exchange information (e.g., router control data, user data, etc.). In one embodiment, these VPN connections are established via D channels or B channels if there is a lot of information to be communicated. As more communication traffic is involved the capacity of the call is increased by including B-channels and using multi-link PPP across the D-channel and the B-channel.

Devices included in network address minimal configuration system 200 also monitor the status of their communications with the dynamic network address registration system/controller 130. If communications are lost between devices included in network address minimal configuration system 200 (e.g., a router or NAT) and dynamic network address registration system/controller 130, after a predetermined time the device (e.g., router or NAT) will attempt to make a circuit switched call to the dynamic network address registration system/controller 130. In one embodiment, this permits VPN recovery in situations when the AODI connection between dynamic network address registration system/controller 130 and its respective ISP goes down and comes back up, resulting in the assignment of a new dynamic IP network address to dynamic network address registration system/controller 130. Alternatively, after establishing a new AODI connection, dynamic network address registration system/controller 130 contacts each of the previously registered devices (e.g., routers and NATs) included in network address minimal configuration system 200 using VPN connections across the Internet to inform the other devices (e.g., routers and NATs) of the new IP network address assigned to dynamic network address registration system/controller 130.

Figure 3:
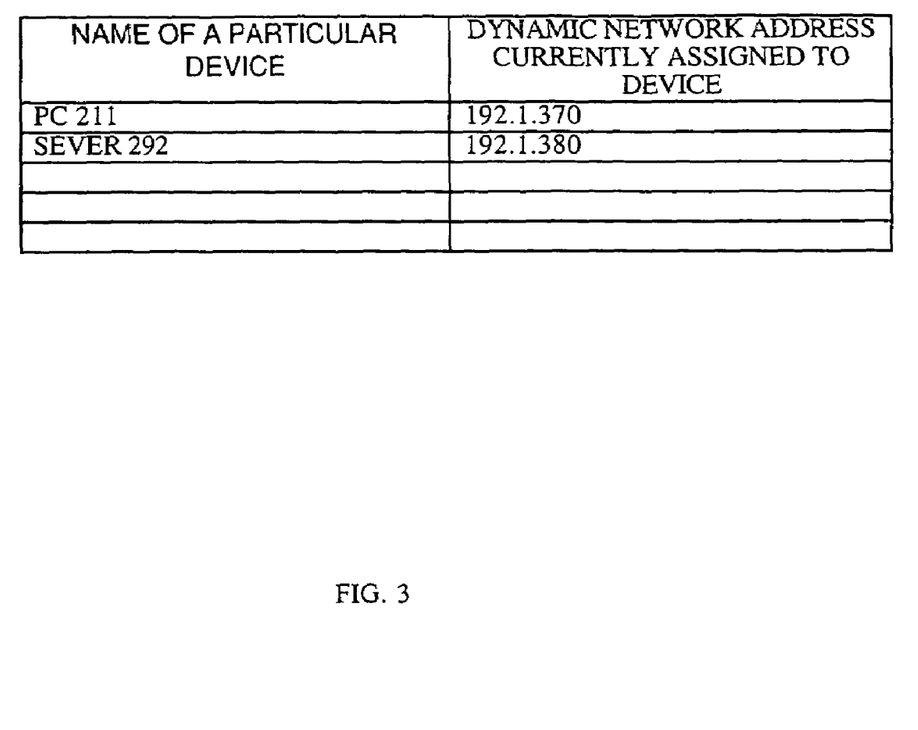
FIG. 3 is an example of one embodiment of a dynamic IP network address mapping table of the present invention.

One embodiment of dynamic address mapping component 140 includes a dynamic IP network address mapping table for devices included in a network. FIG. 3 is an example of one embodiment of a dynamic IP network address mapping table 300. Dynamic IP network address mapping table 300 comprises multiple network rows arranged in two columns including a first column 310 and a second column 320. Entries in a first column 310 indicate the name of a particular device. Data in the second column 320 designates dynamic IP network address that is currently assigned to the device named in the same row in column 310. Information in dynamic IP network address mapping table 300 is utilized by NAT 215 and router 291 during their network communication operations. For example, if a PC 211 is attempting to communicate with server 292 but does not have information regarding an address for server 292, PC 211 issues a request to dynamic network address registration system/controller 130 to provide an IP network address. Dynamic network address registration system/controller 130 determines if server 292 is listed as an entry in the first column 310 of dynamic IP network address mapping table 300 and if there is a match transmits the dynamic IP network address indicated in the same row of dynamic IP network address mapping table 300 to PC 211. Dynamic IP network address mapping table 300 is automatically constructed by dynamic network address registration system/controller 130.

Figure 4:
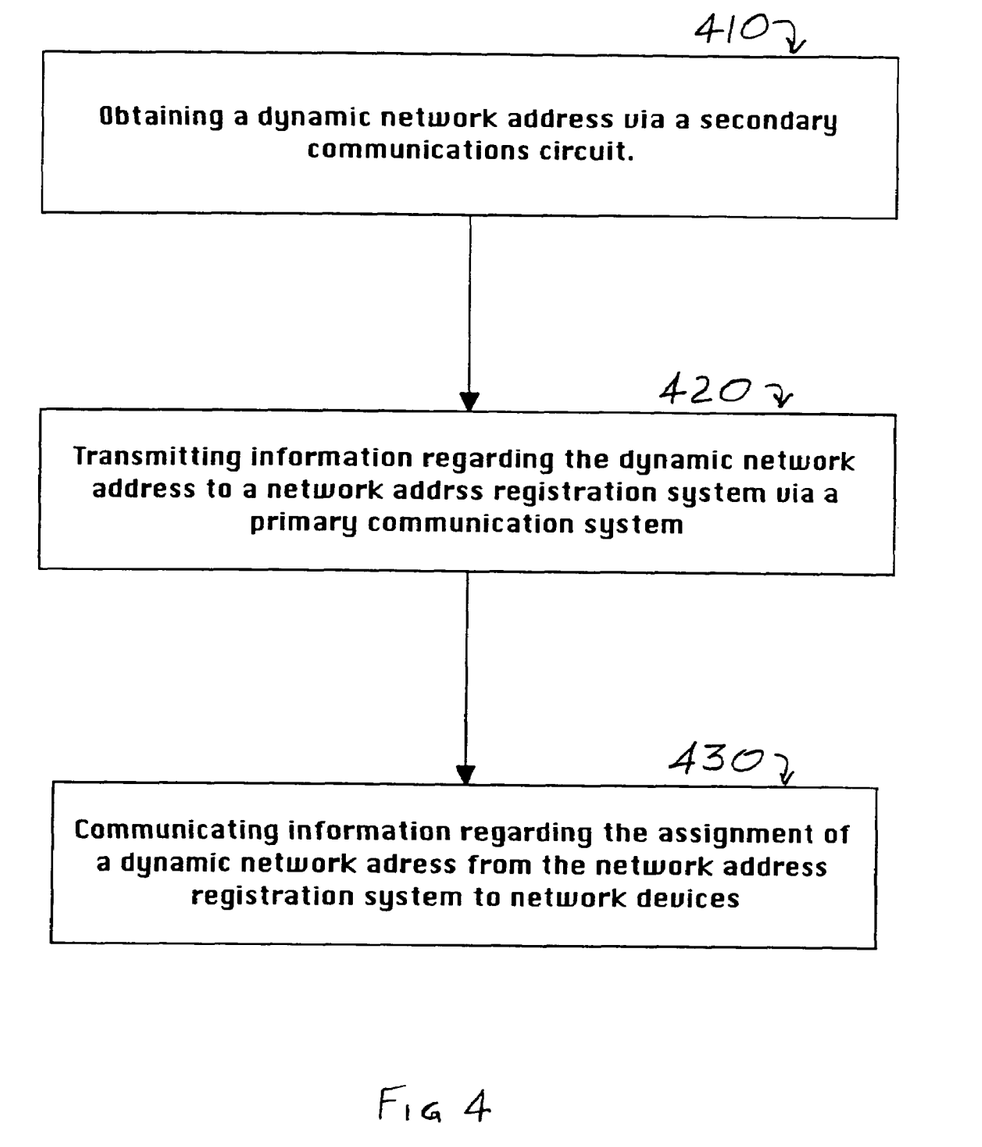
FIG. 4 is a flow chart showing one embodiment of a dynamic network address configuration method of the present invention.

FIG. 4 is a flow chart of dynamic network address configuration method 400 one embodiment of the present invention. Dynamic network address configuration method 400 facilitates identification of dynamic addresses for use in configuring network devices with minimal manual input. In one embodiment of the present invention, dynamic network address configuration method 400 establishes dynamic network addresses via a secondary communications circuit (e.g., a secondary channel) and a VPN via a primary communications circuit (e.g., a primary channel).

In Step 410 dynamic network address configuration method 400 obtains a dynamic network address via a secondary communications circuit. In one embodiment of dynamic network address configuration method 400 a network device establishes a network communication link via a secondary circuit and is assigned a dynamic network address. For example, a PC establishes an Internet connection with an ISP provider via a D channel of an ISDN and is assigned a dynamic network IP address.

Information regarding the assigned dynamic network address is transmitted to a network address registration system in Step 420. The information regarding the assigned dynamic network address is transmitted via a primary communication system. For example a PC transmits information regarding its assigned dynamic network address via a B channel of and ISDN. Information regarding the assigned dynamic network address and it association with a network device (e.g., the PC) is stored in the dynamic network address registration system.

In Step 430 of dynamic network address configuration method 400 information regarding the assignment of a dynamic network address is communicated from the network address registration system to network devices. In one embodiment, a network address associated with a dynamic network address registration system and a dynamic network address associated with a particular network device is forwarded to another network device in an Internet session established vi a primary circuit (e.g., a B channel of a ISDN interface). In one embodiment dynamic network address configuration method 400 automatically polls the dynamic network address registration system to determine if there are updates to information regarding a registered dynamic address.

Hence, the present invention is a system and method that provides network source devices with information regarding a dynamic address assigned to a network destination device. The system and method expedites the establishment of network sessions and supplies dynamic destination address information automatically with a minimum amount of manual network administration intervention. The system and method reduces the amount of user configuration input and interaction required to setup a NAT or router for participation in a VPN session. The system and method facilitates efficient automatic configuration of NATs and routers with dynamic destination network addresses and simplifies connection of communication paths that transport communication frames over one or more networks.

Figure 5:
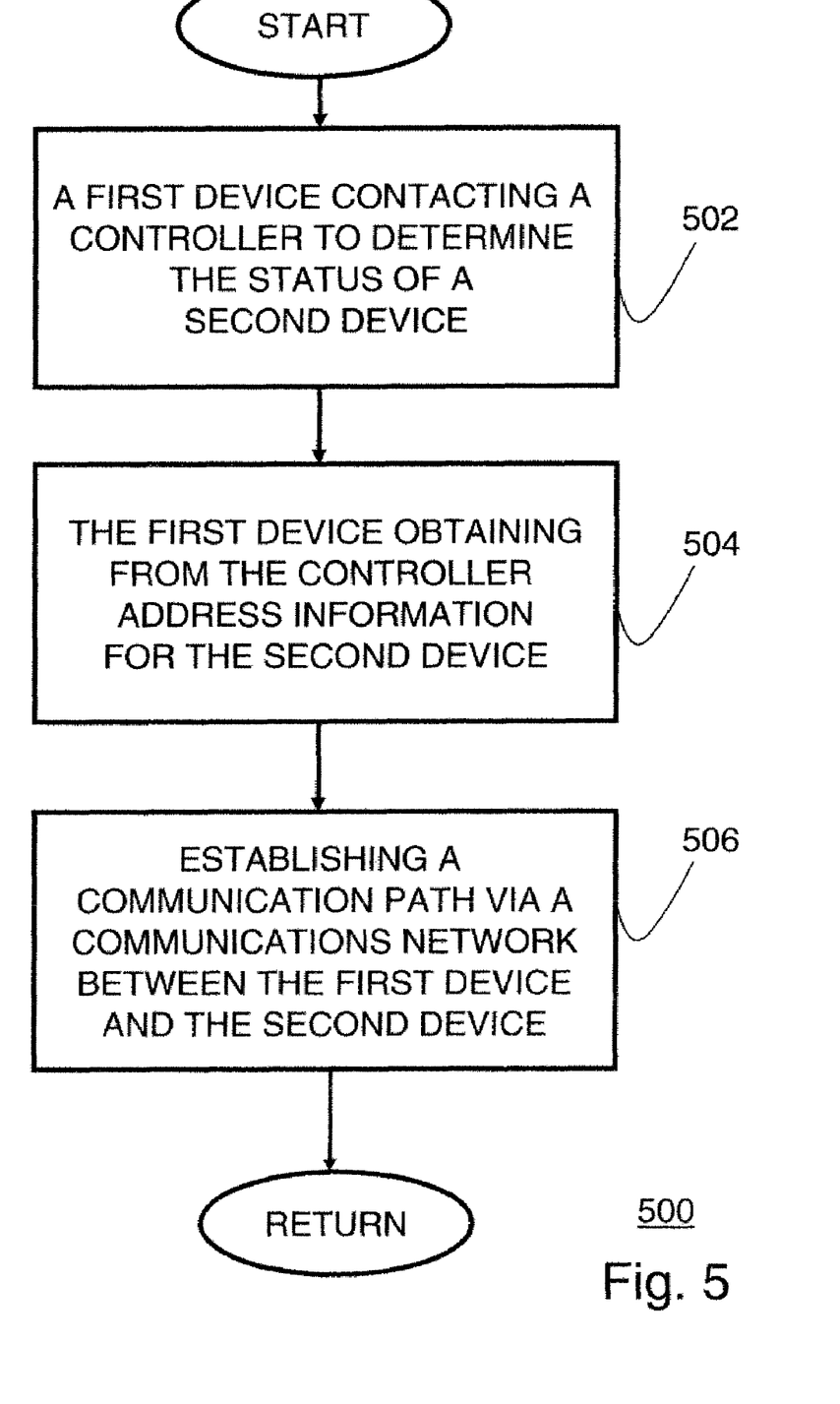
FIG. 5 is a flow chart of steps performed in accordance with one embodiment of the present claimed invention.

Referring now to FIG. 5, a flow chart 500 of steps performed in accordance with one embodiment of the present invention is shown. The steps of FIG. 5 will be discussed in conjunction with the detailed description set forth above and with the features of FIGS. 1A, 1B, 2, 3, and 4. As shown in FIG. 5, at step 502, in this embodiment, a first device (e.g. device A 110) contacts a controller (e.g. dynamic network address registration system/controller 130) to determine the status of a second device (e.g. device A 110). In one embodiment, the first device obtains, from the controller, via a second communications network (e.g. a circuit switched network) the information as to whether or not the second device is coupled to the first communications network (e.g. the internet).

Referring still to step 502 of FIG. 5, in one embodiment, the first device determines from the controller that the second device is not coupled to the first communications network (e.g. the internet). In such a case, the first device instructs the second device, via a second communications network (e.g. a circuit switched network), to couple to the first communications network and report the second device's dynamic address information to the controller. This instruction for the second device is accomplished briefly thereby minimizing the costs associated with the use of the second communications network. The first device then couples to the first communications network, to the controller, and subsequently to the second device. Thus, the controller is aware of and is able to store the dynamic address information of the first device and the dynamic address information of the second device. In so doing, the present embodiment, allows for the efficient establishment of communication path between the first device and the second device via the first communications network. Hence, the present embodiment allows for the establishment of the communication path without requiring that the first device and the second device have a static address. Additionally, the present embodiment does not require communication paths to be established using circuit switched networks for prolonged periods of time.

Referring still to step 502, in another embodiment the first device determines from the controller that the second device is not coupled to the first communications network (e.g. the internet). In such a case, the controller instructs the second device, via a second communications network (e.g. a circuit switched network), to couple to the first communications network and report the second device's dynamic address information to the controller. This instruction for the second device is accomplished briefly thereby minimizing the costs associated with the use of the second communications network. The first device then couples to the first communications network, to the controller, and subsequently to the second device. Thus, the controller is aware of and is able to store the dynamic address information of the first device and the dynamic address information of the second device. In so doing, the present embodiment, allows for the efficient establishment of communication path between the first device and the second device via the first communications network. Hence, the present embodiment allows for the establishment of the communication path without requiring that the first device and the second device have a static address. Additionally, the present embodiment does not require communication paths to be established using circuit switched networks for prolonged periods of time.

At step 504, the first device obtains, from the controller, address information for the second device. That is, as the second device couples to the communications network, the controller is aware of and is able to store the dynamic address information of the second device. As mentioned above, in the present embodiment, the first device also provides the controller with the dynamic address information of the first device.

Referring now to step 506, the present invention then establishes a communication path via a communications network (e.g. the internet) between the first device and the second device. As mentioned above, in the present embodiment, the controller enable efficient establishment of the communication path between the first device and the second device, via the communications network, without requiring the first device and the second device to have static addresses. In yet another embodiment, the controller enables establishment of a virtual private network (VPN) between the first device and the second device via the communications network.

Thus, the present invention provides a method and system for efficiently establishing a communication path between a first device and a second device via a communications network. The present invention further provides a method and system for efficiently establishing a communication path between a first device and a second device wherein the system and method accomplishes the above-listed achievement and does not require communication paths to be established using circuit switched networks for prolonged periods of time. The present invention also provides a method and system for efficiently establishing a communication path between a first device and a second device wherein the system and method accomplishes the above-listed achievements and does not require the use of static addresses.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A dynamic network address registration system, comprising:
    a first device;
    a second device, said first device and said second device adapted to communicate via a communications network; and
    a controller coupled to the internet and to a second communication network, said controller adapted to store a current dynamic network address for each of said first device and said second device therein, said controller operable to receive said current dynamic network addresses via the second communication network and to provide said current dynamic network address of said second device to said first device such that a virtual private network (VPN) can be efficiently established between said first device and said second device using the internet.

2. The dynamic network address registration system of claim 1 wherein said first device and said second device are further adapted to be coupled to the second communication network.

3. The dynamic network address registration system of claim 2 wherein said controller is adapted to inform said first device, via said second communication network, as to whether or not said second device is coupled to the internet.

4. The dynamic network address registration system of claim 2 wherein said controller is adapted to instruct said second device, via said second communications network, to couple to the internet.

5. The dynamic network address registration system of claim 2 wherein said second communications network is a circuit switched network.

6. A method for establishing a virtual private network (VPN) between a first device and a second device via the internet, said method comprising the steps of:
    a) said first device contacting a controller using a second communication network to determine the status of said second device;
    b) said first device obtaining, from said controller, a current dynamic network address for said second device; and
    c) establishing a VPN via the internet between said first device and said second device.

7. The method for establishing a VPN between a first device and a second device as recited in claim 6 wherein said step a) comprises:
    said first device obtaining from said controller, via the second communications network, information as to whether or not said second device is coupled to the internet.

8. The method for establishing a VPN between a first device and a second device as recited in claim 7 wherein said step a) further comprises the step of:
    a1) provided said second device is not coupled to the internet, said first device instructing said second device, via said second communications network, to couple to the internet and to said controller.

9. The method for establishing a VPN between a first device and a second device as recited in claim 7 wherein said step a) further comprises the step of:
    a1) provided said second device is not coupled to the internet, said controller instructing said second device, via said second communications network, to couple to the internet and to said controller.

10. The method for establishing a VPN between a first device and a second device as recited in claim 6 wherein said step b) further comprises the step of:
    b1) said first device providing said controller with a current dynamic address for said first device.

11. The method for establishing a VPN between a first device and a second device as recited in claim 6 wherein said step c) comprises establishing said VPN between said first device and said second device, via said communications network, using current dynamic network addresses of each of the first and second devices.

12. The method for establishing a VPN between a first device and a second device as recited in claim 6 wherein said second communications network is a circuit switched network.

13. A controller for efficiently establishing a virtual private network (VPN) between a first device and a second device via the internet, said controller comprising:
    means for coupling said controller to the internet;
    means for storing a current dynamic network address for said first device received via a second communication network;
    means for storing a current dynamic network address for said second device received via the second communication network;
    means for providing said current dynamic network address of said second device to said first device such that said VPN can be established between said first device and said second device via the internet.

14. The controller of claim 13 wherein said first device, said second device, and said controller are further adapted to be coupled to the second communications network.

15. The controller of claim 14 wherein said controller is adapted to inform said first device, via said second communications network, to couple to the internet.

16. The controller of claim 14 wherein said controller is adapted to instruct said second device, via said second communications network, to couple to the internet.

17. The controller of claim 14 wherein said second communications network is a circuit switched network.

* * * * *